(12) United States Patent
Foster

(10) Patent No.: US 12,378,065 B2
(45) Date of Patent: Aug. 5, 2025

(54) COMMERCIAL CONTAINER CARTRIDGE SYSTEM

(71) Applicant: Rehrig Pacific Company, Los Angeles, CA (US)

(72) Inventor: Derick Foster, Cumming, GA (US)

(73) Assignee: Rehrig Pacific Company, Monterey Park, CA (US)

( * ) Notice: Subject to any disclaimer, the term of this patent is extended or adjusted under 35 U.S.C. 154(b) by 186 days.

(21) Appl. No.: 17/994,812

(22) Filed: Nov. 28, 2022

(65) Prior Publication Data

US 2023/0166905 A1 Jun. 1, 2023

Related U.S. Application Data

(60) Provisional application No. 63/283,516, filed on Nov. 28, 2021.

(51) Int. Cl.

| | |
|---|---|
| *B65F 1/08* | (2006.01) |
| *B62B 1/26* | (2006.01) |
| *B65D 6/34* | (2006.01) |
| *B65F 1/06* | (2006.01) |
| *B65F 1/14* | (2006.01) |
| *B65F 1/16* | (2006.01) |
| *B65F 1/12* | (2006.01) |

(52) U.S. Cl.
CPC .............. *B65F 1/1415* (2013.01); *B62B 1/26* (2013.01); *B65D 11/28* (2013.01); *B65F 1/067* (2013.01); *B65F 1/085* (2013.01); *B65F 1/141* (2013.01); *B65F 1/1473* (2013.01); *B65F 1/1646* (2013.01); *B62B 2202/20* (2013.01); *B65F 1/122* (2013.01)

(58) Field of Classification Search
CPC .... B62B 2202/20; B65F 3/005; B65F 1/0033; B65F 1/122; B65F 1/08; B65F 1/1452; B65F 1/141; B65F 1/1415; B65F 1/0093; B65F 1/006; B65F 1/0073; B65F 1/0066; B65F 2001/0086; B65D 11/28
USPC ..................................... 211/71.01, 79, 126.15
See application file for complete search history.

(56) References Cited

U.S. PATENT DOCUMENTS

| | | | |
|---|---|---|---|
| 2,473,160 A | 6/1949 | Madrigal | |
| 3,042,238 A * | 7/1962 | Bryan ..................... | B65F 1/125 |
| | | | 414/424 |

(Continued)

FOREIGN PATENT DOCUMENTS

| | | | | |
|---|---|---|---|---|
| CA | 2259822 A1 * | 7/2000 | ............ | B65F 1/0046 |
| EP | 0551402 B1 * | 5/1994 | | |

(Continued)

*Primary Examiner* — Mollie Impink
(74) *Attorney, Agent, or Firm* — Carlson, Gaskey & Olds, P.C.

(57) ABSTRACT

A container system includes a base including a body having a plurality of dividers defining a plurality of bays for receiving smaller containers therein. A plurality of tongues protrude toward one another from the plurality of dividers. The body includes tine openings for receiving tines to lift and invert the base. A smaller container is receivable in each of the plurality of bays. The smaller containers each include a pair of grooves for receiving two of the plurality of tongues. Each of the smaller containers is supported by a plurality of wheels and has a lid pivotably positioned over an opening.

10 Claims, 15 Drawing Sheets

(56) References Cited

U.S. PATENT DOCUMENTS

| | | | |
|---|---|---|---|
| 3,122,249 A * | 2/1964 | Dempster | B65F 3/046 |
| | | | 414/408 |
| 3,669,485 A | 6/1972 | Stihler | |
| 3,823,973 A | 7/1974 | Ramer | |
| 4,335,828 A | 6/1982 | Robinson et al. | |
| 4,375,265 A | 3/1983 | van de Wetering et al. | |
| 4,515,518 A * | 5/1985 | Gilbert | B60P 1/6445 |
| | | | 280/43.23 |
| 4,550,849 A * | 11/1985 | Adsit | B65F 1/122 |
| | | | 220/908 |
| 4,630,750 A | 12/1986 | Hughes | |
| 4,726,616 A | 2/1988 | Schmidt | |
| 4,741,658 A | 5/1988 | Zelinka et al. | |
| 4,750,638 A | 6/1988 | Sosower | |
| 4,765,503 A * | 8/1988 | Otto | B65F 1/122 |
| | | | 414/408 |
| 4,819,582 A | 4/1989 | Lichvar | |
| 4,892,220 A | 1/1990 | Foos | |
| 4,949,866 A | 8/1990 | Sanders | |
| 4,955,495 A | 9/1990 | Ruebesam | |
| 5,038,962 A | 8/1991 | Ruebesam | |
| 5,076,458 A | 12/1991 | Weiner et al. | |
| 5,118,005 A | 6/1992 | Onodera | |
| 5,135,245 A * | 8/1992 | Pagone | B65F 1/006 |
| | | | 280/79.5 |
| 5,156,296 A | 10/1992 | Vasquez | |
| 5,183,180 A | 2/1993 | Hawkins et al. | |
| 5,222,536 A | 6/1993 | Hodgdon et al. | |
| 5,261,562 A | 11/1993 | Prout et al. | |
| 5,330,071 A | 7/1994 | Parker | |
| 5,447,251 A * | 9/1995 | Taylor | B65F 1/10 |
| | | | 220/523 |
| 5,460,277 A * | 10/1995 | Silva | A45C 5/00 |
| | | | 294/162 |
| 5,547,097 A * | 8/1996 | Lyon | B65F 1/141 |
| | | | 220/909 |
| 5,673,811 A | 10/1997 | Dickinson et al. | |
| 5,967,361 A | 10/1999 | Darnell | |
| 6,203,034 B1 * | 3/2001 | Houry | B60B 33/0021 |
| | | | 220/769 |
| 6,280,001 B1 | 8/2001 | Parker et al. | |
| 6,632,064 B1 | 10/2003 | Walker et al. | |
| 6,918,508 B2 | 1/2005 | Hwang | |
| 7,100,791 B2 | 9/2006 | Berger | |
| 7,198,166 B2 | 4/2007 | Sholinder | |
| 7,237,689 B2 * | 7/2007 | Maggio, Sr. | B65F 1/1473 |
| | | | 220/675 |
| D564,168 S | 3/2008 | Larin | |
| 7,762,565 B2 | 7/2010 | Tatamian et al. | |
| 7,784,642 B2 | 8/2010 | Gavin et al. | |
| 8,141,921 B2 | 3/2012 | Apps et al. | |
| D657,105 S | 4/2012 | Martheenal | |
| 8,322,561 B2 | 12/2012 | Ramsey et al. | |
| 8,449,008 B2 | 5/2013 | Apps et al. | |
| 8,453,872 B1 | 6/2013 | Holmes | |
| 8,631,940 B2 | 1/2014 | Hay et al. | |
| 8,720,686 B1 | 5/2014 | Shuman | |
| 8,770,641 B2 | 7/2014 | Hassell et al. | |
| 8,833,593 B2 | 9/2014 | Martheenal | |
| 8,875,937 B2 | 11/2014 | Hay et al. | |
| 9,056,717 B2 | 6/2015 | Lobban | |
| 9,273,485 B2 | 3/2016 | Goode | |
| 9,387,984 B1 | 7/2016 | Lovett | |
| 9,567,159 B2 | 2/2017 | Loney et al. | |
| 9,878,846 B2 | 1/2018 | Strom | |
| 9,908,694 B2 * | 3/2018 | Christenson | B65F 1/122 |
| 10,144,583 B2 | 12/2018 | Monaco et al. | |
| D845,577 S | 4/2019 | Foster | |
| 10,442,619 B2 | 10/2019 | Loney et al. | |
| D868,410 S | 11/2019 | Schwalbach | |
| D872,323 S | 1/2020 | Schmidt | |
| 10,661,983 B2 | 5/2020 | Monaco et al. | |
| 11,492,196 B2 * | 11/2022 | Pung | B65F 1/1468 |
| 2001/0027826 A1 | 10/2001 | Carpenter | |
| 2006/0045680 A1 | 3/2006 | d'Arc Lorenz et al. | |
| 2006/0060593 A1 | 3/2006 | Maggio, Sr. et al. | |
| 2008/0135556 A1 | 6/2008 | Bontrager et al. | |
| 2009/0179444 A1 | 7/2009 | Apps et al. | |
| 2011/0036853 A1 | 2/2011 | Ramsey et al. | |
| 2011/0036854 A1 | 2/2011 | Baltz | |
| 2012/0043327 A1 | 2/2012 | Baltz et al. | |
| 2012/0055834 A1 | 3/2012 | Hay et al. | |
| 2012/0132662 A1 | 5/2012 | Apps et al. | |
| 2014/0091088 A1 | 4/2014 | Hay et al. | |
| 2014/0314530 A1 | 10/2014 | Strom | |
| 2018/0257858 A1 * | 9/2018 | Apps | B65F 1/02 |
| 2021/0107735 A1 | 4/2021 | Foster | |
| 2023/0243181 A1 | 8/2023 | Boesch et al. | |

FOREIGN PATENT DOCUMENTS

| | | |
|---|---|---|
| EP | 3092178 B1 | 12/2018 |
| GB | 2522091 A | 7/2015 |

* cited by examiner

US 12,378,065 B2

COMMERCIAL CONTAINER CARTRIDGE SYSTEM

BACKGROUND

Collecting and disposing of organic waste in high volume areas can be challenging due to the high weight and high rate of fill. The organic waste is particularly dense and heavy.

SUMMARY

A commercial container cartridge system utilizes three smaller cartridges (e.g. 75 gallons each) for collecting organic waste and a base that receives the three smaller cartridges. All three containers are lifted and emptied at once by lifting and inverting the base.

A large waste container is a base for smaller sub containers (or "cartridges"). The smaller containers let the end user safely drop off their waste without necessitating a mechanical device for dumping the sub container into the larger container. This design also allows a hauler to be efficient in their service route by tipping all of the sub containers at once. The sub containers simply push into the main container and use a tongue and groove feature to lock into place. The main body of this container can be a "Front load" or "Rear load" design. The base container is a service device for the smaller sub containers to plug into.

The smaller cartridge container allows the user to easily push the cartridge around by using a built-in dolly with a pivoting $3^{rd}$ wheel. The cartridge or sub container plugs into the main body. The main body has a pivoting lock bar on the front that lifts up to allow the cartridge to enter. When the large waste container (base) is serviced, the lids on the cartridge container swing open to allow the waste to fall out.

DETAILED DESCRIPTION

A commercial container cartridge system 10, particularly suited for collecting organic waste, is shown in FIGS. 1-12.

Figure 1:
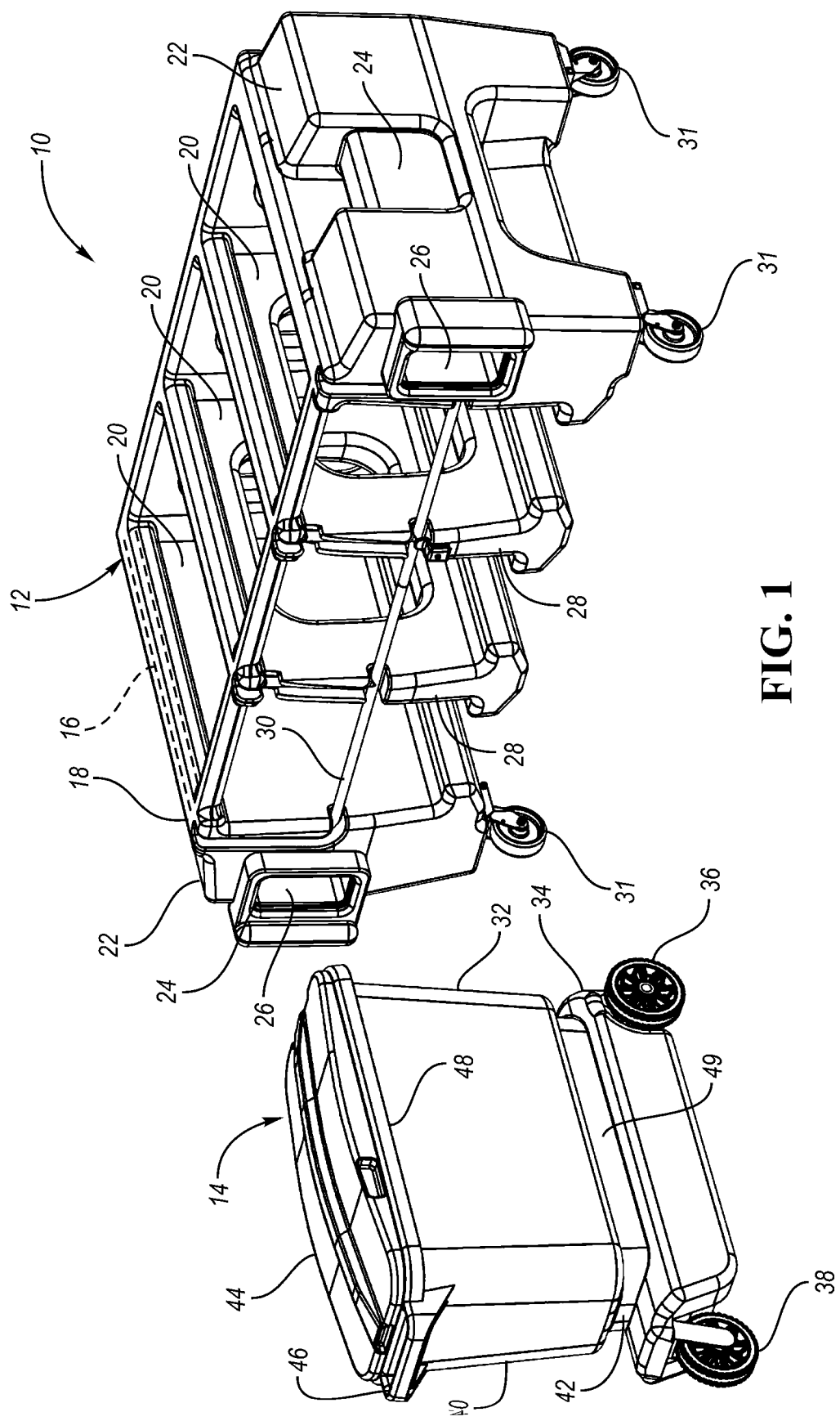
FIG. 1 is a front perspective view of a commercial container cartridge system showing the base and one cartridge.

Referring to FIG. 1, the commercial container cartridge system 10 includes a base 12 and a plurality of cartridges 14 (only one shown in FIG. 1). The base 12 includes a metal frame 16, which may for example comprise a plurality of connected metal tubes (such as 1.5" tube steel). The base 12 also includes a plastic body 18 enclosing the metal frame 16, such as by rotomolding.

The base 12 defines a plurality of bays 20 (in this example, three) between outer columns 22. Each of the outer columns 22 has a sleeve 24 received therein. Each sleeve 24 defines a tine-receiving opening 26. The sleeve 24 may be formed separately, such as by injection molding or rotomolding, and may optionally be formed of a tougher plastic. The sleeves 24 are sized and positioned to receive the tines of a waste-collection truck having standard tines for lifting and inverting commercial containers (dumpsters). For example, the distance between the inner surfaces of the tine openings may be approximately six feet.

Dividers 28 separate the bays 20. A lock bar 30 is pivotably attached to an upper front edge of the metal frame 16. The lock bar 30 is shown in the downward, closed position in FIG. 1, over the front openings to the bays 20. Wheels 31, such as wheels mounted on casters, support the columns 22 at the corners of the base 12.

One of the cartridges 14 is shown in FIG. 1. The cartridge 14 includes a deck 34 having a plurality of wheels, such as rear wheels 36 and a front caster 38. A container 40 is supported on the deck 34. The container 40 includes a base wall 42 secured to the deck 34 and a side wall 32 extending upward from the base wall 42. A lid 44 is pivotably secured to the container 40. A handle 46 projects from one end of the container 40. The container 40 includes a lip 48 projecting outward and downward from an upper edge of the side wall 32 about the periphery of the container 40. A longitudinally-elongated recess or groove 49 is formed along each side of the container 40, in this example between the side wall 32 of the container 40 and the deck 34, adjacent the base wall 42 of the container 40. The container 40 and deck 34 may be molded of plastic separately and then removably secured to one another for maintenance, shipping, and cleaning. Alternatively, the container 40 may be molded integrally with the deck 34 as a single piece of plastic, such as by rotomolding or injection molding.

Figure 2:
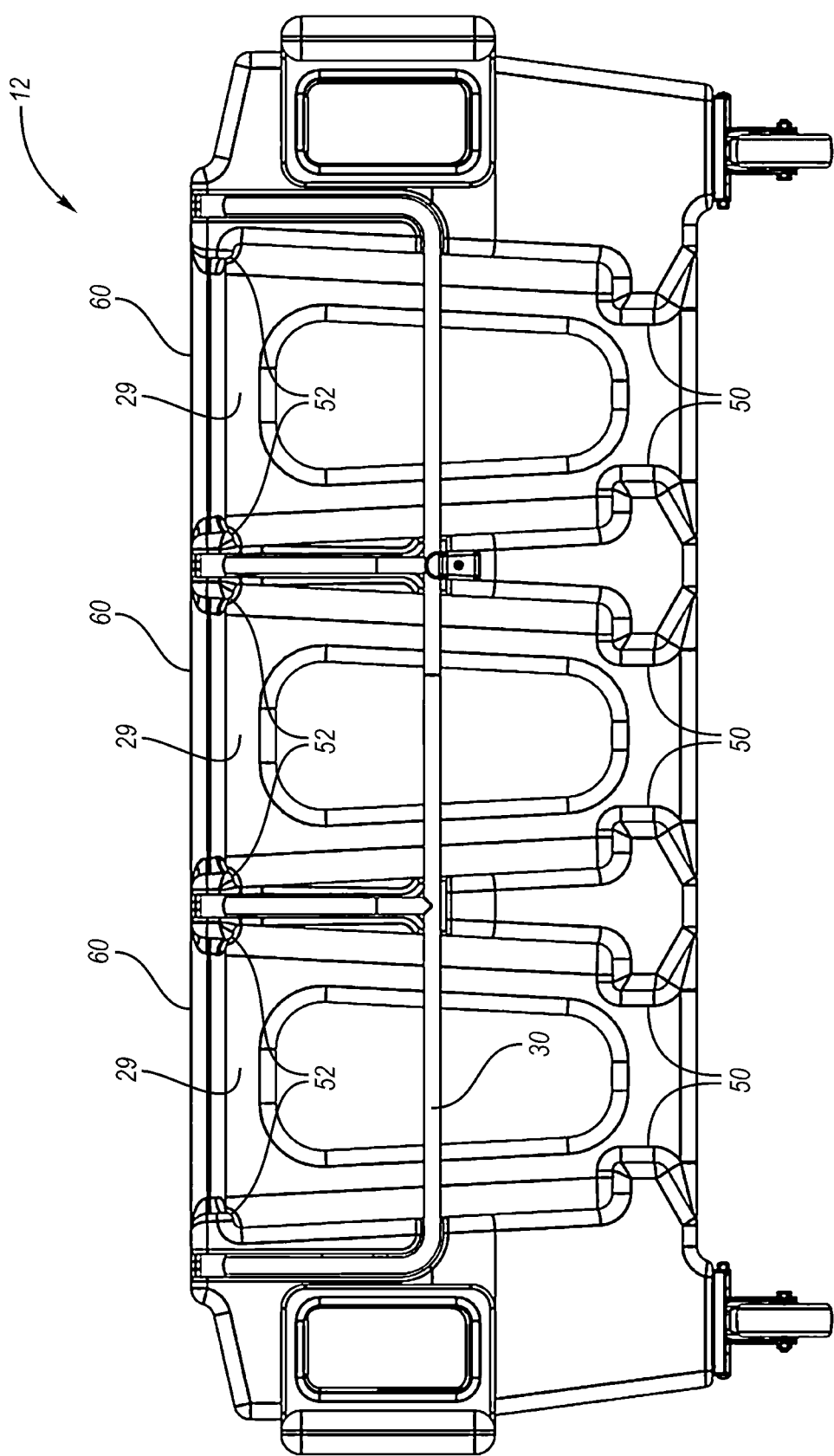
FIG. 2 is a front view of the base of FIG. 1.
Figure 3:
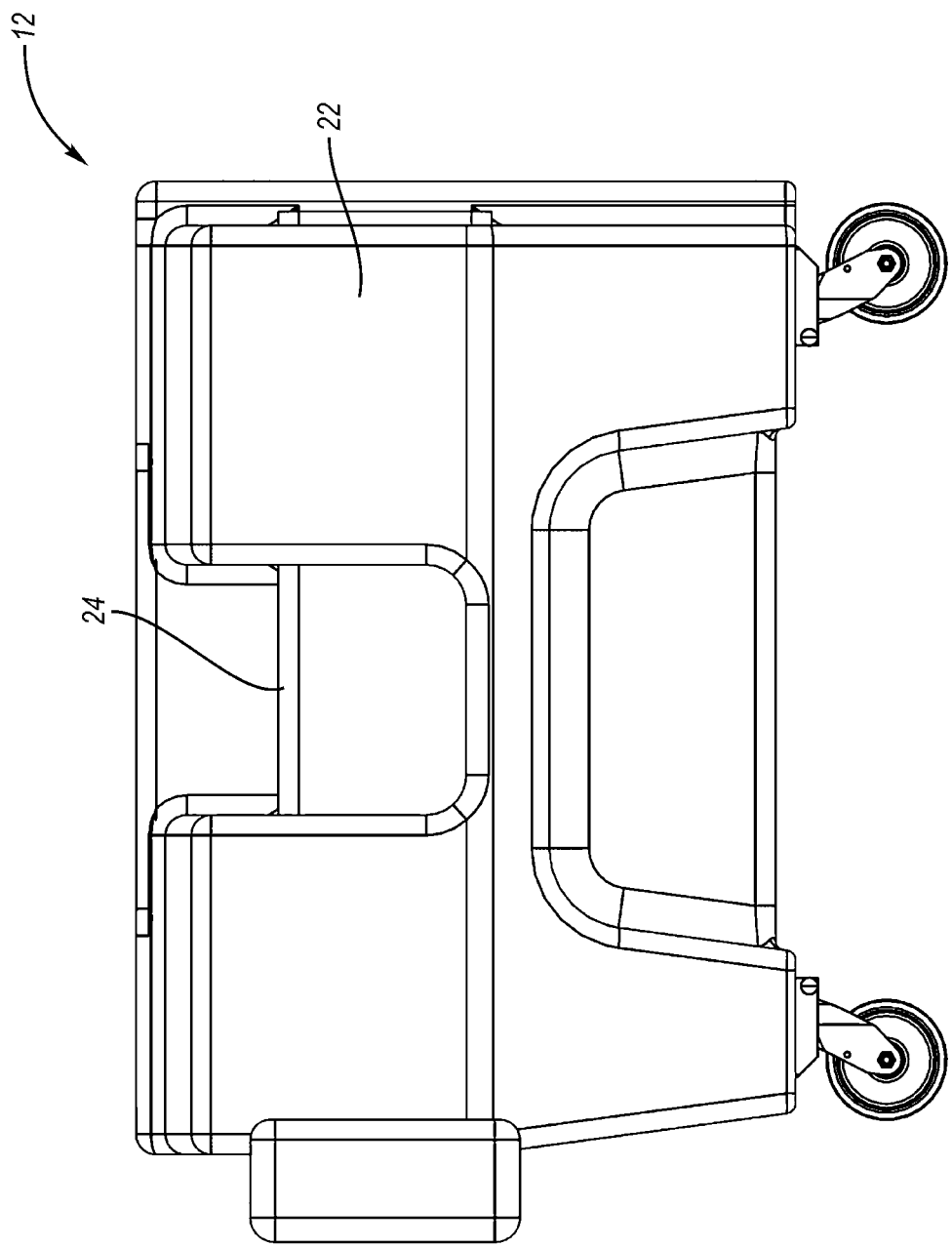
FIG. 3 is a side view of the base of FIG. 1.

FIG. 2 is a front view of the base 12 of FIG. 1, again with the lock bar 30 in the closed, downward position. FIG. 3 is a side view of the base 12. As shown, the sleeve 24 is retained in the column 22.

Figure 4:
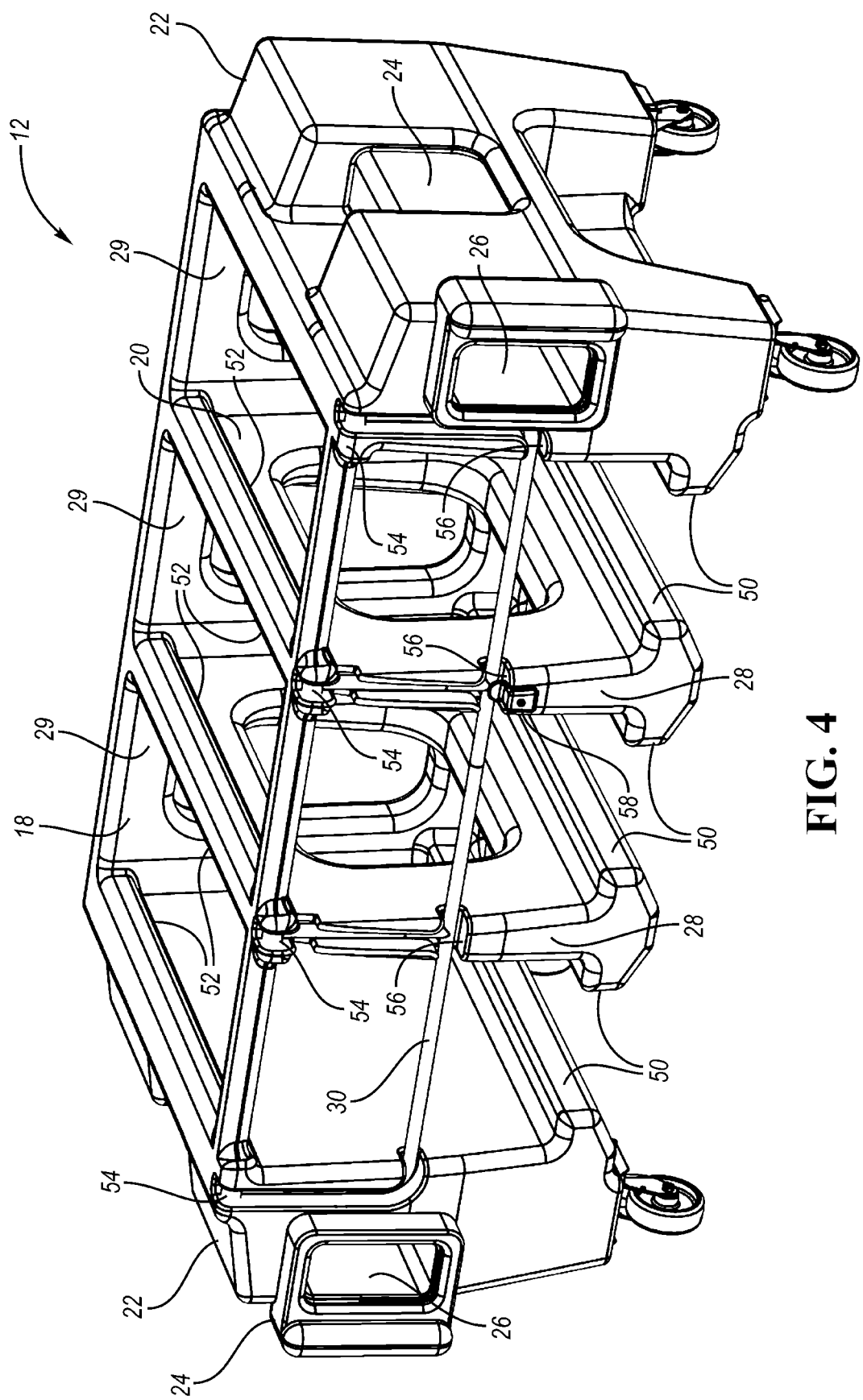
FIG. 4 is a front perspective view of the base of FIG. 1.

FIG. 4 is a front perspective view of the base 12. In this embodiment, openings to the bays 20 are defined at a front of the base 12 and rear walls 29 are formed at the rear of each bay 20. Alternatively, the openings could be at the rear of the base 12 and the walls could be at the front of the base 12.

Within each bay 20, lower projections 50 project into the bays 20 toward one another from the columns 22 and the dividers 28. Upper projections 52 project into the bays 20 toward one another from the columns 22 and the dividers at an upper edge of the bays 20.

The lock bar 30 is pivotably connected to the frame 16 by hinges 54. An outer portion of the lock bar 30 is received in horizontal slots 56 in front edges of the columns 22 and the dividers 28. At least one of the dividers 28 includes a lock 58 or latch for retaining the lock bar 30 in the closed, downward position.

Figure 5:
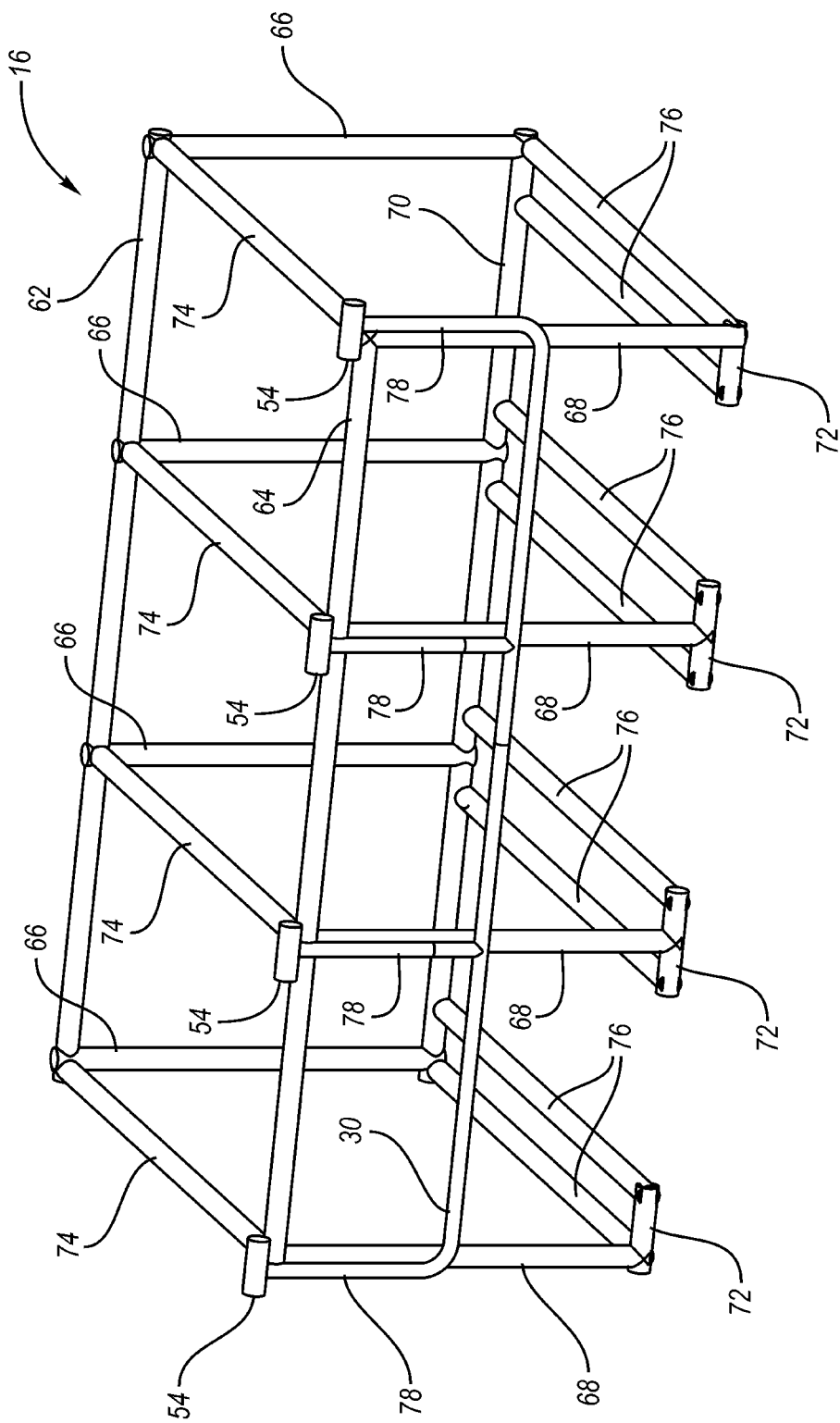
FIG. 5 is a perspective view of the frame of the base of FIG. 1.

FIG. 5 is a perspective view of the frame 16. The frame 16 includes an upper rear bar 62 extending across the upper rear edge of the frame 16. An upper front bar 64 extends across the upper front edge of the frame 16. A plurality (in this example, four) of vertical rear posts 66 extend downward from the upper rear bar 62. A plurality (in this example, four) of vertical front posts 68 extend downward from the upper front bar 64. A lower rear bar 70 extends horizontally across the lower rear edge of the frame 16 and connects to the lower ends of the vertical rear posts 66. A plurality of short horizontal lower front bars 72 are positioned at lower ends of the vertical front posts 68. A plurality of horizontal upper cross-bars 74 extend from the upper front bar 64 to the upper rear bar 62. A plurality of pairs of horizontal lower cross-bars 76 extend from the short horizontal lower front bars 72 to the lower rear bar 70. One pair of horizontal lower cross-bars 76 extends from each of the short horizontal lower front bars 72 to the lower rear bar 70. The lock bar 30 extends horizontally across the lower ends of a plurality of arms 78, each connected by one of the hinges 54 to the upper front bar 64.

Figure 6:
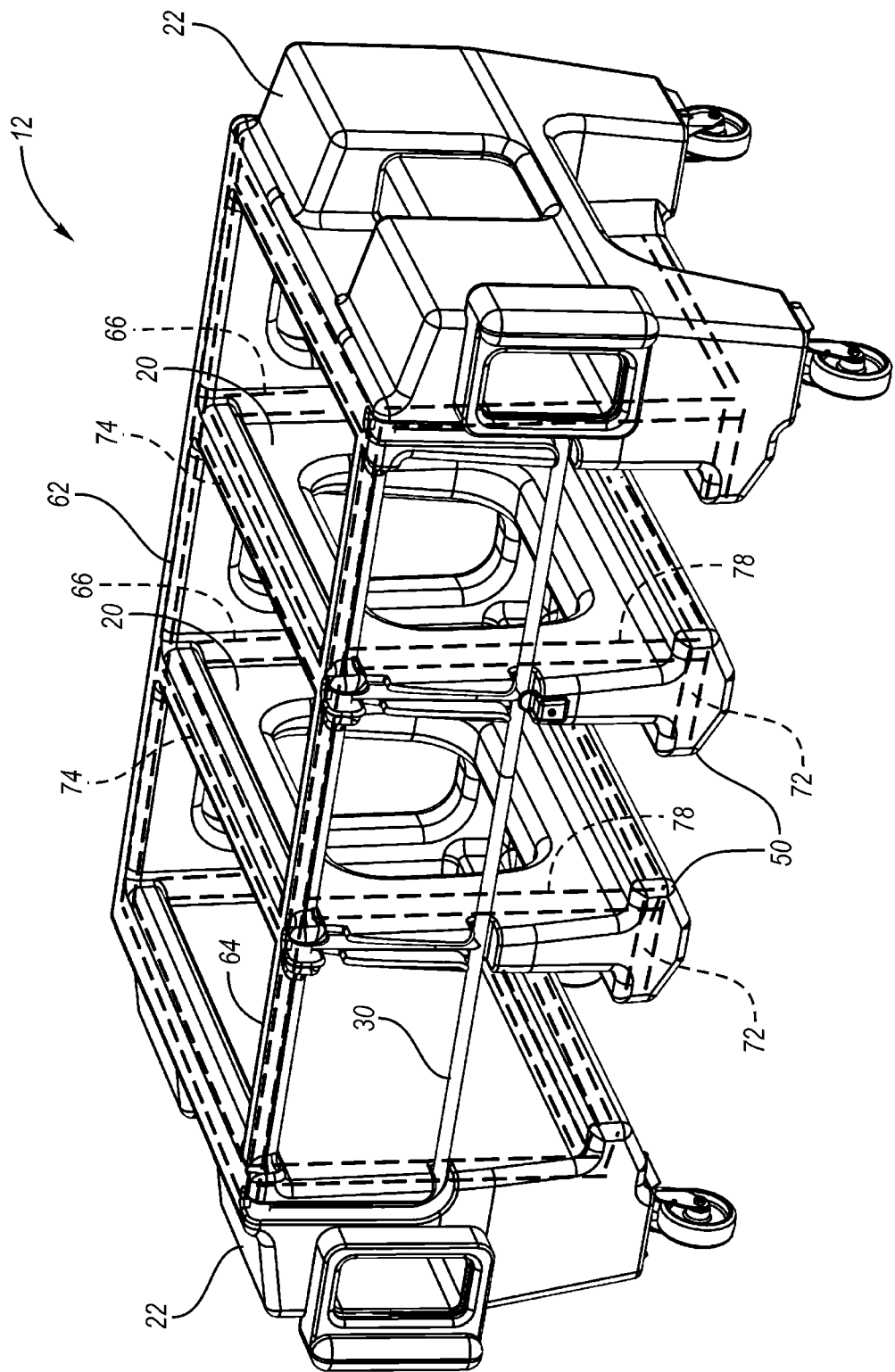
FIG. 6 is a perspective view of the base of FIG. 4, showing the frame within the base.

FIG. 6 is a perspective view of the base 12 showing the frame 16 in broken lines within the plastic body of the base 12. Each divider 28 is defined by a portion of the plastic body molded over one of the horizontal upper cross-bars 74, one of the vertical rear posts 66, one of the vertical front posts 68, one of the short horizontal lower front bars 72, and a pair of the horizontal lower cross-bars 76. Each of the columns 22 also includes within that portion of the plastic body one of the horizontal upper cross-bars 74, one of the vertical rear posts 66, one of the vertical front posts 68, one of the short horizontal lower front bars 72, and a pair of the horizontal lower cross-bars 76.

Figure 7:
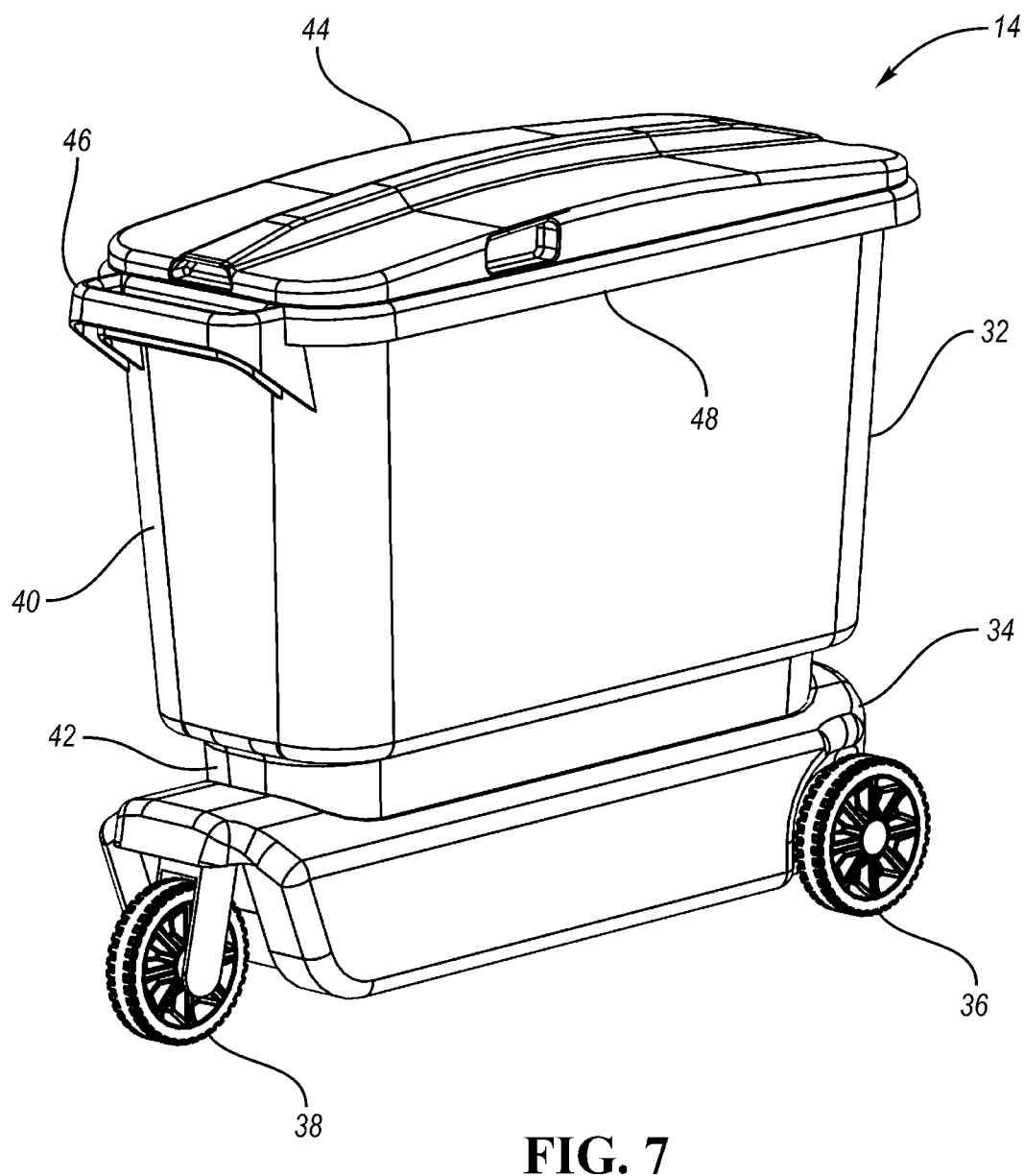
FIG. 7 is a perspective view of the cartridge of FIG. 1.
Figure 8:
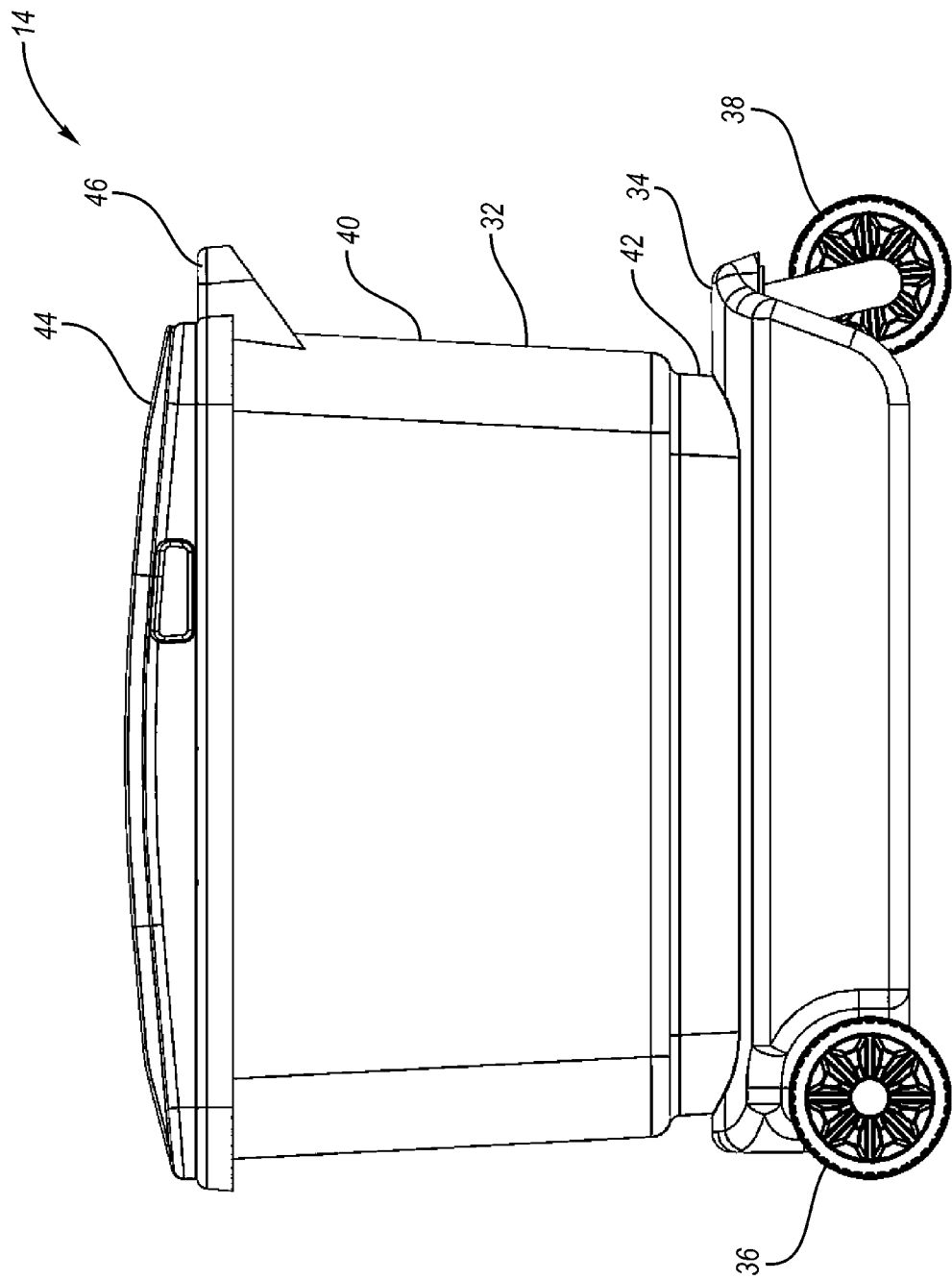
FIG. 8 is a side view of the cartridge of FIG. 5.
Figure 9:
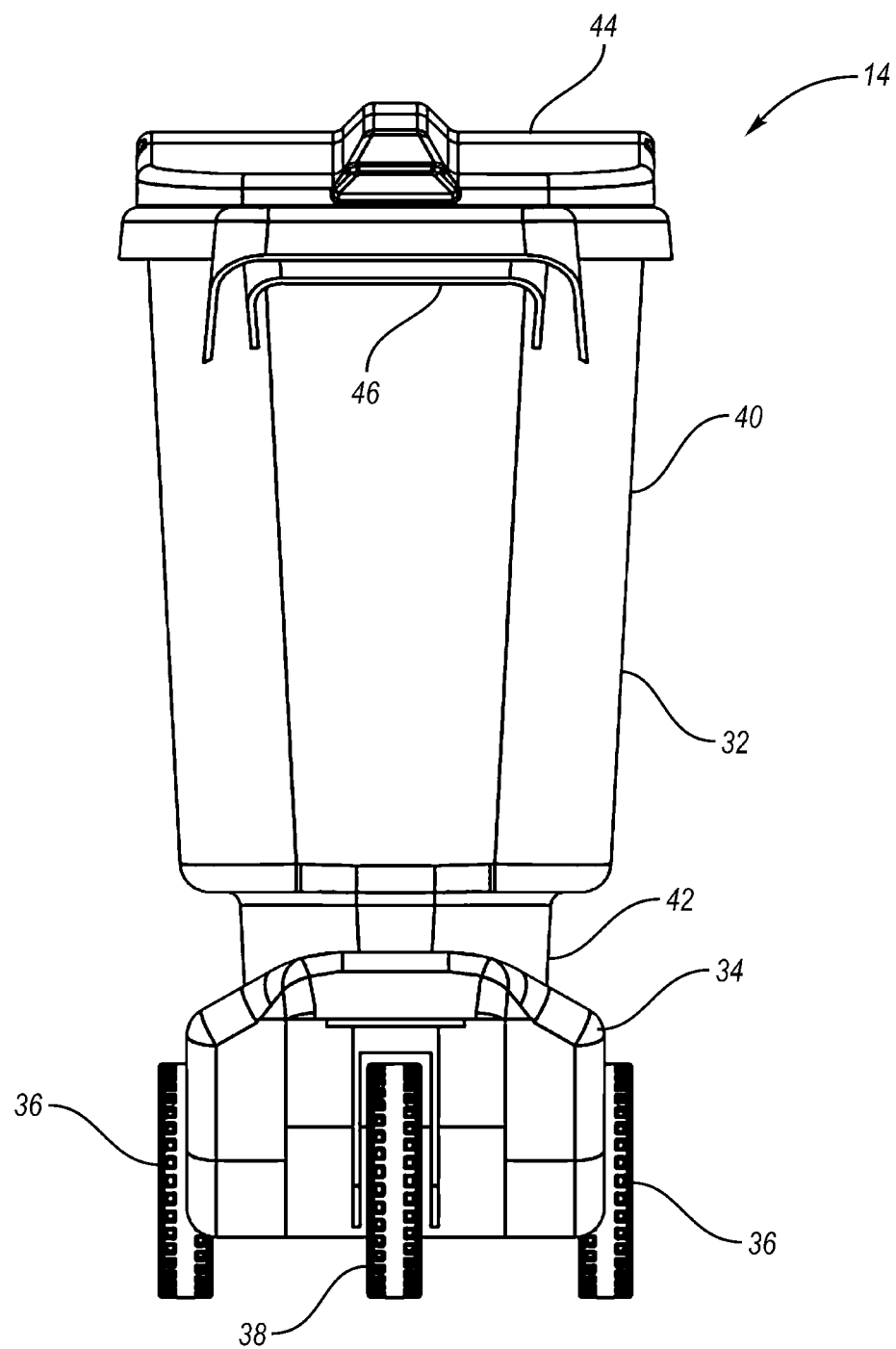
FIG. 9 is a front view of the cartridge of FIG. 6.

FIG. 7 is a perspective view of one of the cartridges 14. Again, the cartridge 14 includes the deck 34 having the rear wheels 36 and the front caster 38. The container 40 is supported on the deck 34. The container 40 includes the base wall 42 secured to the deck 34 and the side wall extending upward from the base wall 42. The lid 44 is pivotably secured to the container 40, in this example, at the end of the container 40 opposite the handle 46. The handle 46 projects from one end of the container 40. The lip 48 projects outward and downward from the upper edge of the side wall about the periphery of the container 40. The grooves 49 are formed along each side of the container 40, in this example between the side wall of the container 40 and the deck 34, adjacent the base wall 42 of the container 40. FIG. 8 is a side view of the cartridge 14. FIG. 9 is a rear view of the cartridge 14.

Figure 10:
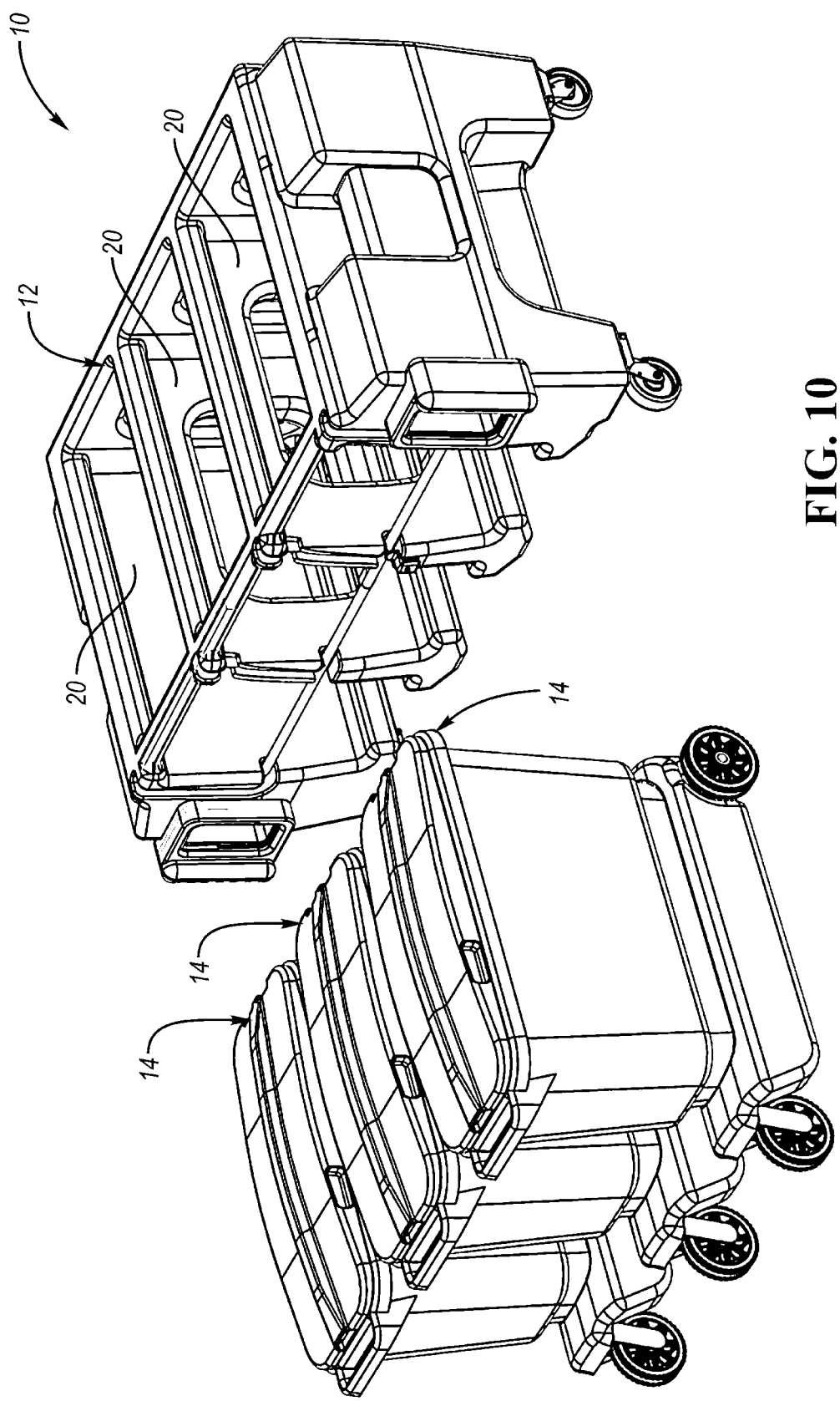
FIG. 10 is a front perspective view of the commercial container cartridge system of FIG. 1 showing the base and three cartridges removed from the base.
Figure 11:
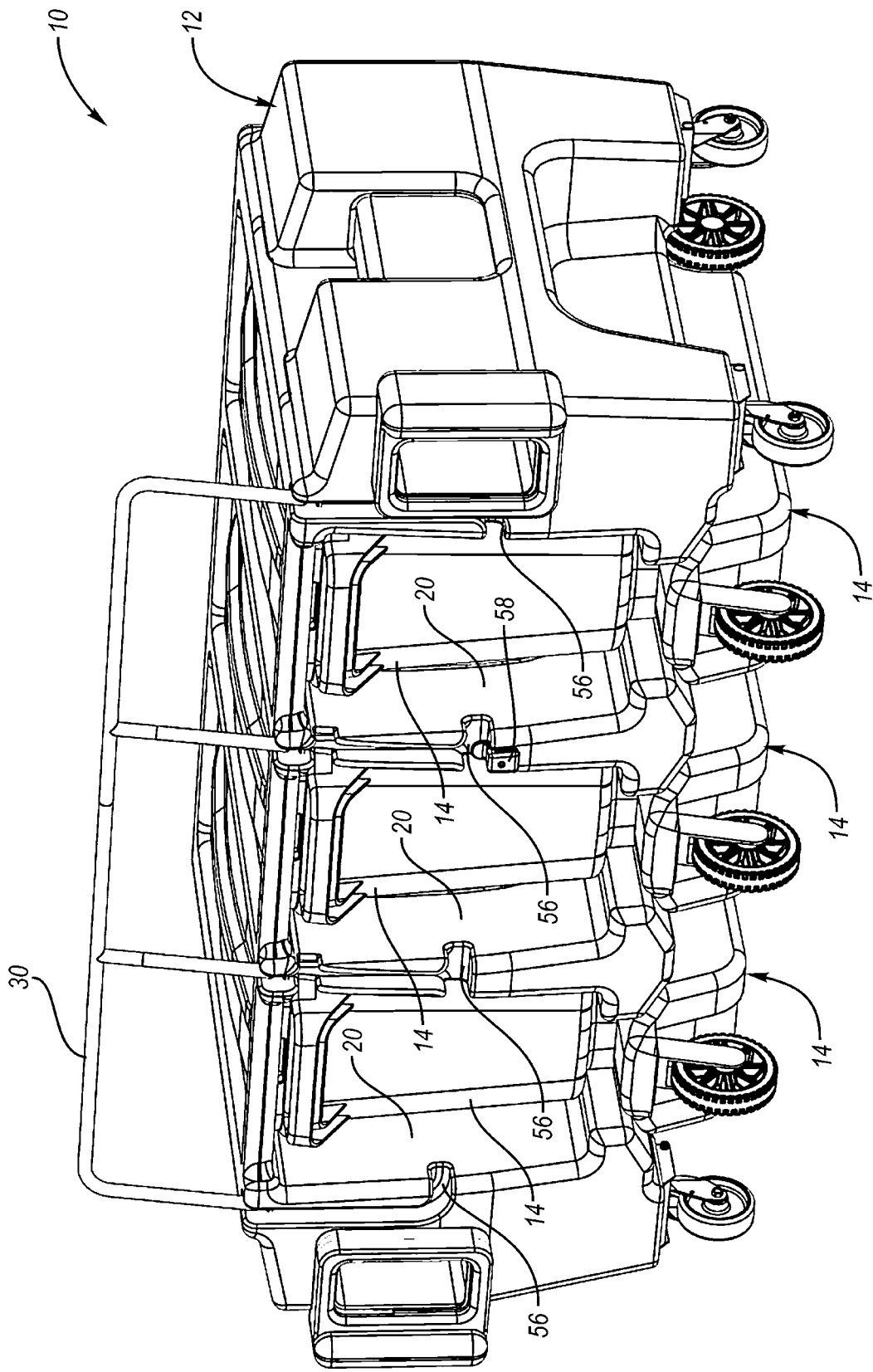
FIG. 11 shows the base and cartridges of FIG. 8 with the cartridges received in the base.

FIG. 10 shows the three cartridges 14 positioned in front of the three bays 20 of the base 12. A user would open the lock bar 30 by unlocking (or unlatching) it and then pivoting the lock bar 30 upward as shown in FIG. 11. The user can the roll each of the cartridges 14 into one of the bays 20 as shown in FIG. 11.

Figure 12:
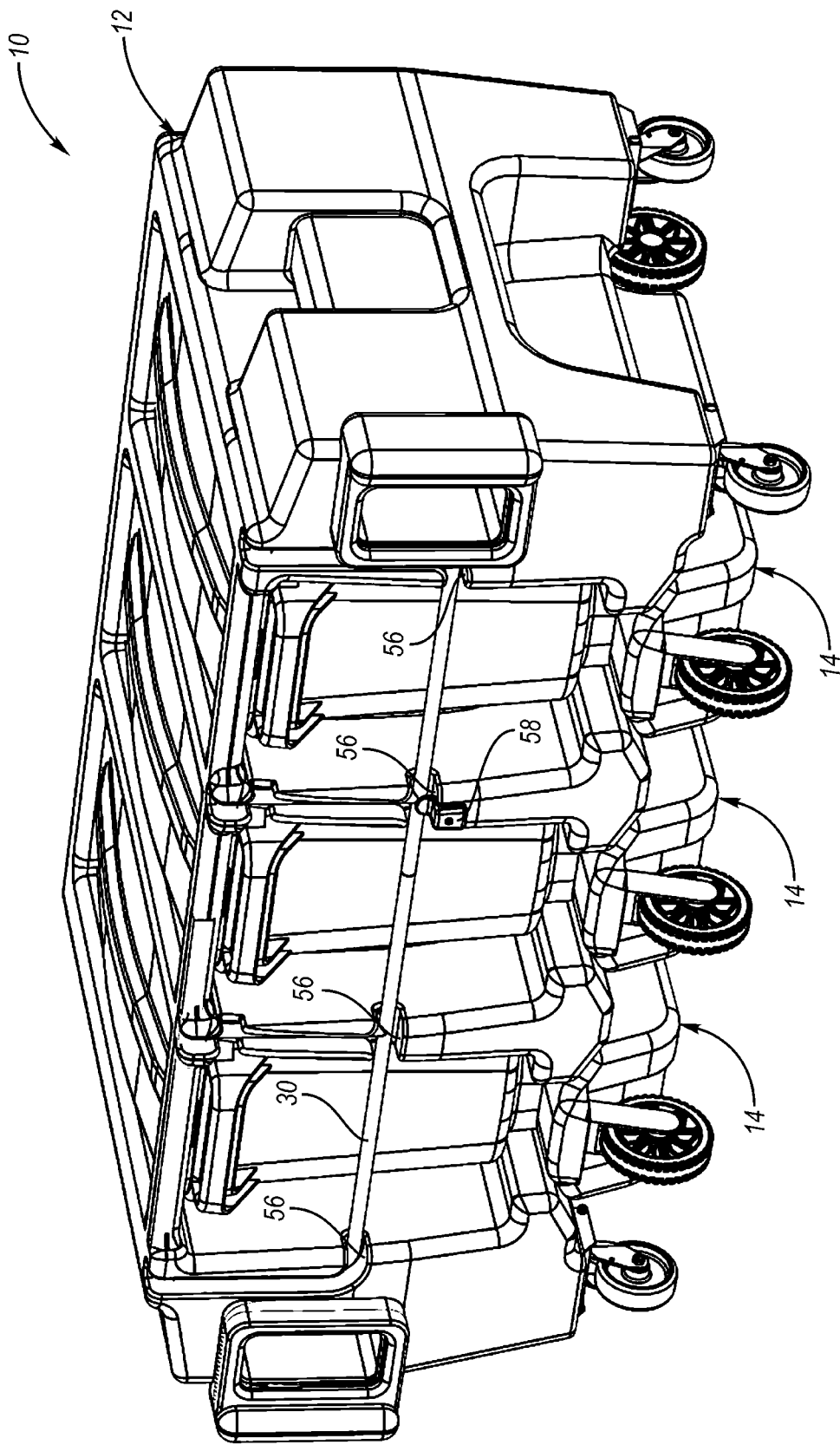
FIG. 12 shows the base and cartridges of FIG. 9 with the lock bar in a locked position.
Figure 15:
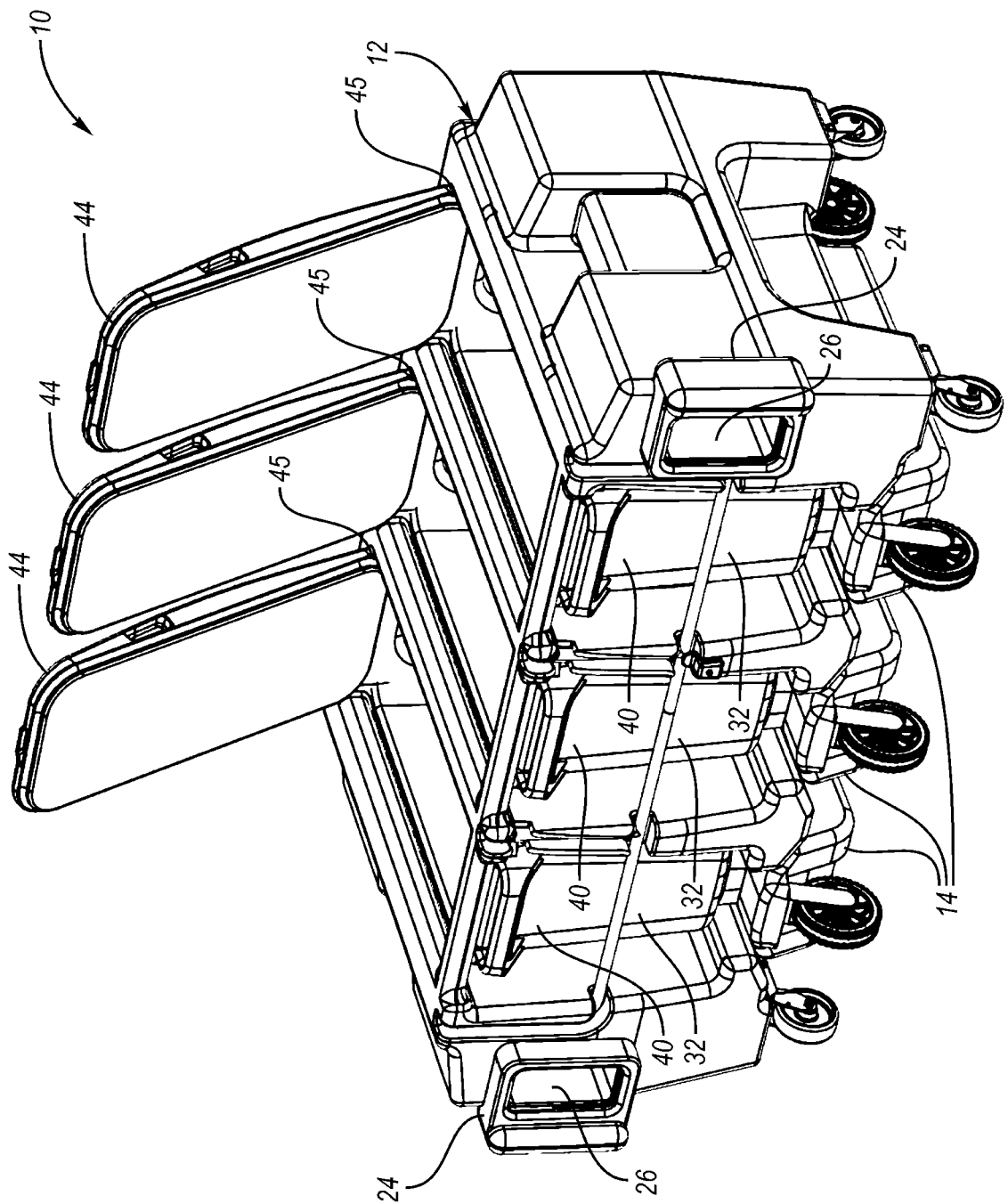
FIG. 15 shows the base and cartridges of FIG. 12 with the lids of the cartridges open.

The lock bar 30 is then pivoted downward in the slots 56 and retained there by the lock 58 (or latch) as shown in FIG. 12. In this position, a waste collection truck can insert tines into the tine-receiving openings 26 of the sleeves 24. The truck can then lift and invert the commercial container cartridge system 10 as a single unit. While inverted, the lids 44 of the cartridges 14 pivot open as shown in FIG. 15 and the contents of all of the cartridges 14 is received in the waste collection truck.

Figure 13:
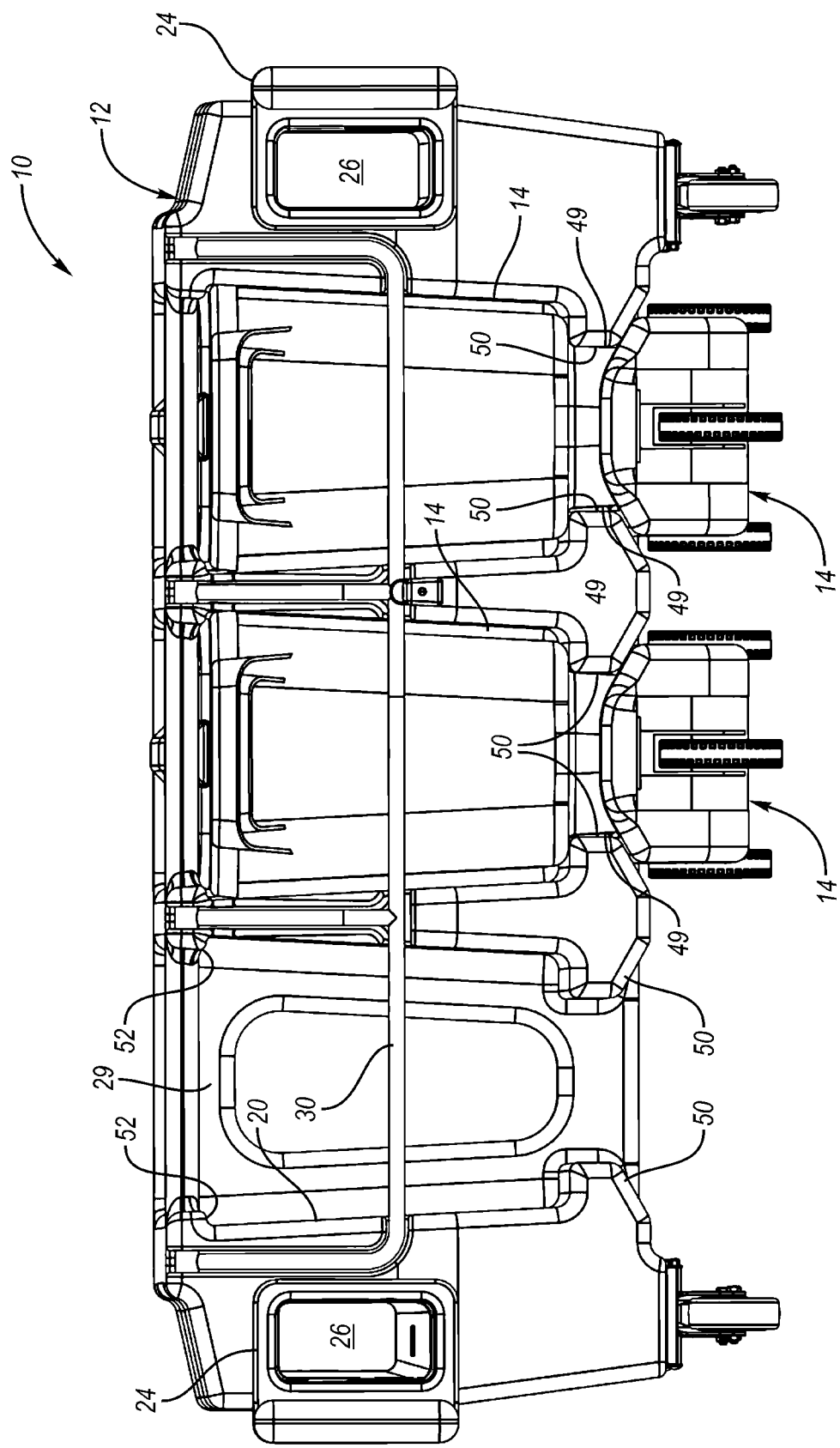
FIG. 13 is a front view of base and the cartridges of FIG. 12, with one of the cartridges removed.

Referring to FIG. 13, the cartridges 14 are retained in the base 12 even when inverted. The lower projections 50 are tongues received in the grooves 49 of the cartridges 14 and the upper projections 52 are received above the lip 48 and side wall of the container 40. The lower projections 50 and the upper projections 52 retain the cartridges 14 in the base 12 even when inverted.

Figure 14:
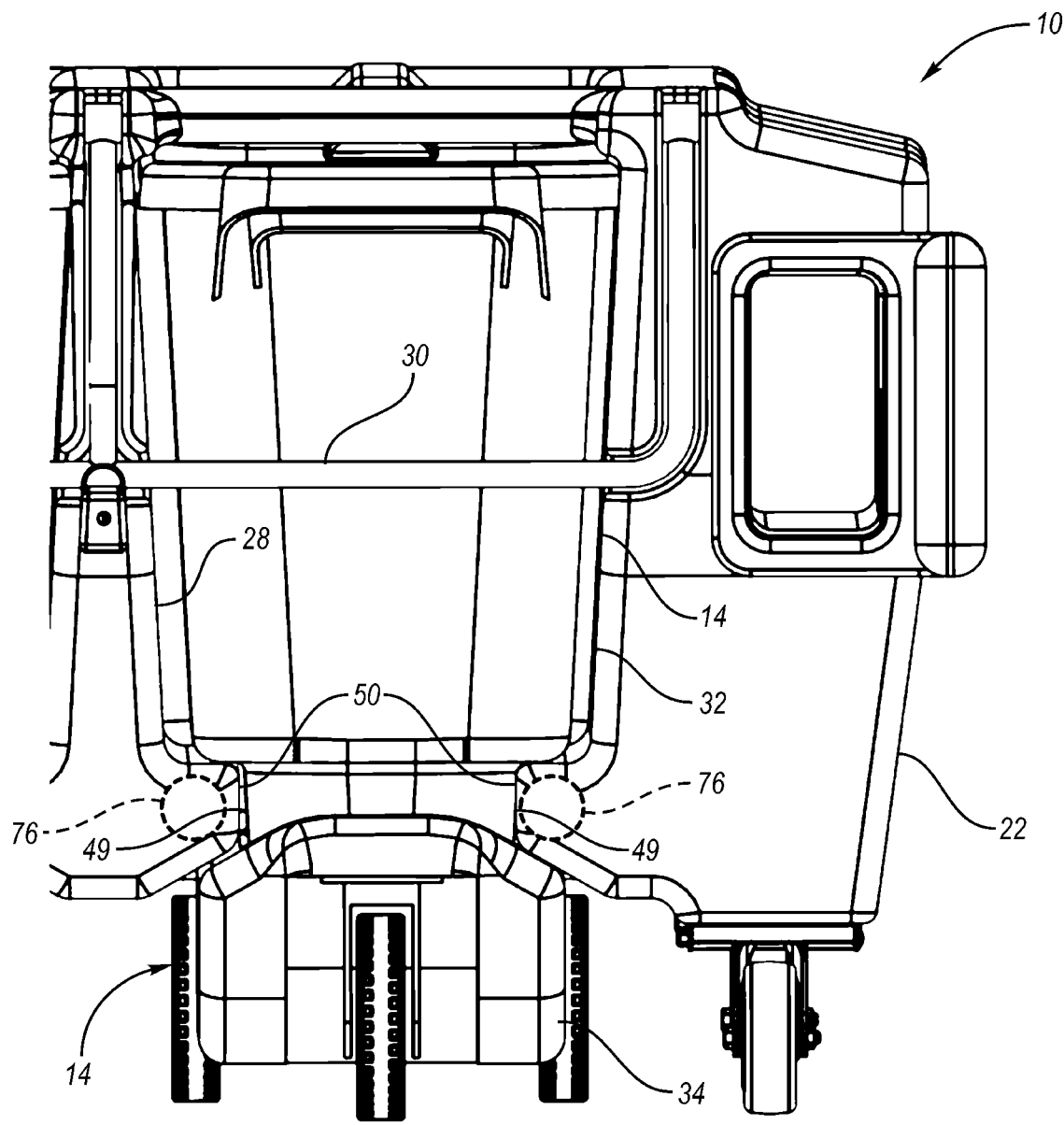
FIG. 14 is an enlarged view of one of the bays of the system of FIG. 13.

FIG. 14 is an enlarged view of one of the bays 20 of the commercial container cartridge system 10 of FIG. 13, showing portions of the horizontal lower cross-bars 76. Within each of the lower projections 50 is one of the horizontal lower cross-bars 76. The horizontal lower cross-bars 76 are within the grooves 49 in the cartridge 14. This reinforces the lower projections 50 to retain the cartridges 14, especially when the commercial container cartridge system 10 is inverted to dump the contents of the cartridges 14.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A container comprising:
   a body defining a plurality of bays for receiving smaller containers therein, the body including outer columns partially defining two of the plurality of bays;
   a plurality of wheels secured to the outer columns;
   tine openings for receiving tines to lift and invert the container; and
   tongues protruding into the plurality of bays for engaging grooves of smaller containers to be received therein.

2. A container comprising:
   a body defining a plurality of bays for receiving smaller containers therein;
   tine openings for receiving tines to lift and invert the container;
   a metal frame within the body; and
   tongues protruding into the plurality of bays for engaging grooves of smaller containers to be received therein, and wherein the metal frame includes bars within the tongues.

3. The container of claim 2 wherein the tine openings are approximately six feet apart from one another.

4. The container of claim 2 further including sleeves received in the tine openings.

5. A waste container cartridge comprising;
   an elongated container having a base wall supported by a plurality of wheels;
   a lip projecting outward from an upper edge of a side wall of the container, the lip extending parallel to a long axis of the container;
   a lid covering an opening at an upper end of the container, wherein the lid is pivotably connected to the container about an axis transverse to the long axis of the container; and
   a groove along a side of the waste container cartridge for receiving a tongue of a base, wherein the groove is generally parallel to the long axis of the container.

6. The waste container cartridge of claim 5 wherein the groove is a first groove on a first side of the waste container cartridge, the waste container cartridge further including a second groove on a second side of the waste container cartridge, the second groove generally parallel to the long axis of the container.

7. A container system including:
   a base including a body having a plurality of dividers defining a plurality of bays for receiving smaller containers therein, the body including tine openings for receiving tines to lift and invert the base, a metal frame within the body, wherein the body is formed of plastic; and
   a smaller container received in each of the plurality of bays, wherein each of the smaller containers connects to at least one of the plurality of dividers by a tongue and groove connection which is configured to retain the smaller container in the base when the base is inverted, wherein each of the smaller containers is supported by a plurality of wheels and has a lid pivotably positioned over an opening.

8. The container system of claim 7 wherein the tine openings are approximately six feet apart from one another.

9. The container system of claim 8 further including sleeves received in the tine openings.

10. The container system of claim 9 further including a lock bar movable between a closed position over openings to the plurality of bays and an open position away from the openings to the plurality of bays.

\* \* \* \* \*